Feb. 24, 1959 — C. A. DE GIERS ET AL — 2,875,431
INDICATORS FOR TELEMETERING SYSTEMS
Filed Oct. 21, 1955 — 7 Sheets-Sheet 2

INVENTORS
CLARENCE A. de GIERS
ERNEST V. SORENY
BY Robert S. Dunham
ATTORNEY

United States Patent Office 2,875,431
Patented Feb. 24, 1959

---

2,875,431

INDICATORS FOR TELEMETERING SYSTEMS

Clarence A. de Giers, Roslyn, and Ernest V. Soreny, Brooklyn, N. Y., assignors to The Liquidometer Corporation, a corporation of Delaware Application October 21, 1955, Serial No. 541,878

14 Claims. (Cl. 340—316)

---

This invention relates to telemetering systems and is directed more particularly to an improved indicator for use in connection with such systems.

Since a practically unlimited amount of electrical and electronic instrumentation can be used profitably in military aircraft, the packaging and product engineering of such instruments have been the subject of an intensive and wide range development program over the latest years. This program is continuing into the future with unabated interest.

One of the aims of this vigorous development program is the creation of grouping electronic indicators which have those common objectives of all electronic instrument design: namely, the miniaturization of size, weight, and cost, and the magnification of accuracy, durability and reliability and fidelity.

We provide low frictional properties so as to insure the operation of this type of instrument on extremely low voltages.

In modern aircraft, as more and more safety and automatic features are added, the instrument panel becomes so full of instruments that it is difficult for the pilot readily to visualize and read such instruments, and it increases the pilot's fatigue. Also it is necessary with such instruments to increase the volumetric space, which is already scarce on aircraft. Now in order to get more indicator devices in substantially the same space on said panels without crowding, one object of our invention is the provision of an indicator with amplification smaller in volume than has heretofore been known.

In such indicators, we have found that the one main feature which enables the miniaturization of the device described and claimed was the provision of a double internal gear wherein a central web separates the teeth into two effective units, one of which meshes with the gear train driven by the motor, and the other of which meshes with a pinion on a shaft carrying the sub-pointer of the indicator. Therefore one of the principal objects of the invention is the miniaturization of an indicator by the use of internal gear, one portion of which is driven by the gear train and the other portion of which drives the pinion on the shaft carrying the sub-pointer on the indicator. The main pointer is supported by the hub of the double internal gear and consequently it moves in time with the movement of the latter.

Another object of the invention is the provision, in an indicator, of a rotor surrounding a motor and carrying potentiometers, collector rings interconnected therewith, and cams, said rotor being in the form of a hollow cylinder and having one end journaled on an anti-friction bearing and having the other end carrying an internal ring gear and supported for rotation by the peripheral engagement of roller bearing means peripherally engaging therewith.

Another object of the invention is the provision, in an indicator, of cam actuated switches having longitudinal switching elements extending substantially parallel to the axis of the rotor.

Another object of the invention is the provision, in an indicator, of novel supporting means for brushes which contact the collector rings carried by the rotor.

Yet another object of the invention is the provision, in an indicator, of cam controlled switches of the "microtype" extending substantially parallel to the axis of the indicator and mounted on a support in said indicator, said support also having its axis parallel to the axis of the indicator.

Still another object of the invention is the provision, in an indicator having a rotor, of a cam controlled switch body having longitudinal contactor elements which extend parallel to the axis of said indicator and swingably supported on said indicator, engageable means on said body in cooperative relation to a cam on said rotor, toggle means on said body for controlling said contactor elements, and adjustable means comprising a radially disposed screw for backing up said toggle means and insuring the actuation of at least one of said contactor elements.

A further object of the invention is the provision of the switching means of the toggle type having a body with the longitudinal axis thereof parallel to the axis of the indicator and conjointly supported by spaced apart posts which distance two heads or plates in the indicator a pre-determined distance apart.

Other objects and advantages of the invention will be apparent to those skilled in the art upon a study of this specification and the accompanying drawings.

Referring to the drawings, which are given by way of example to illustrate the invention.

Figure 1:
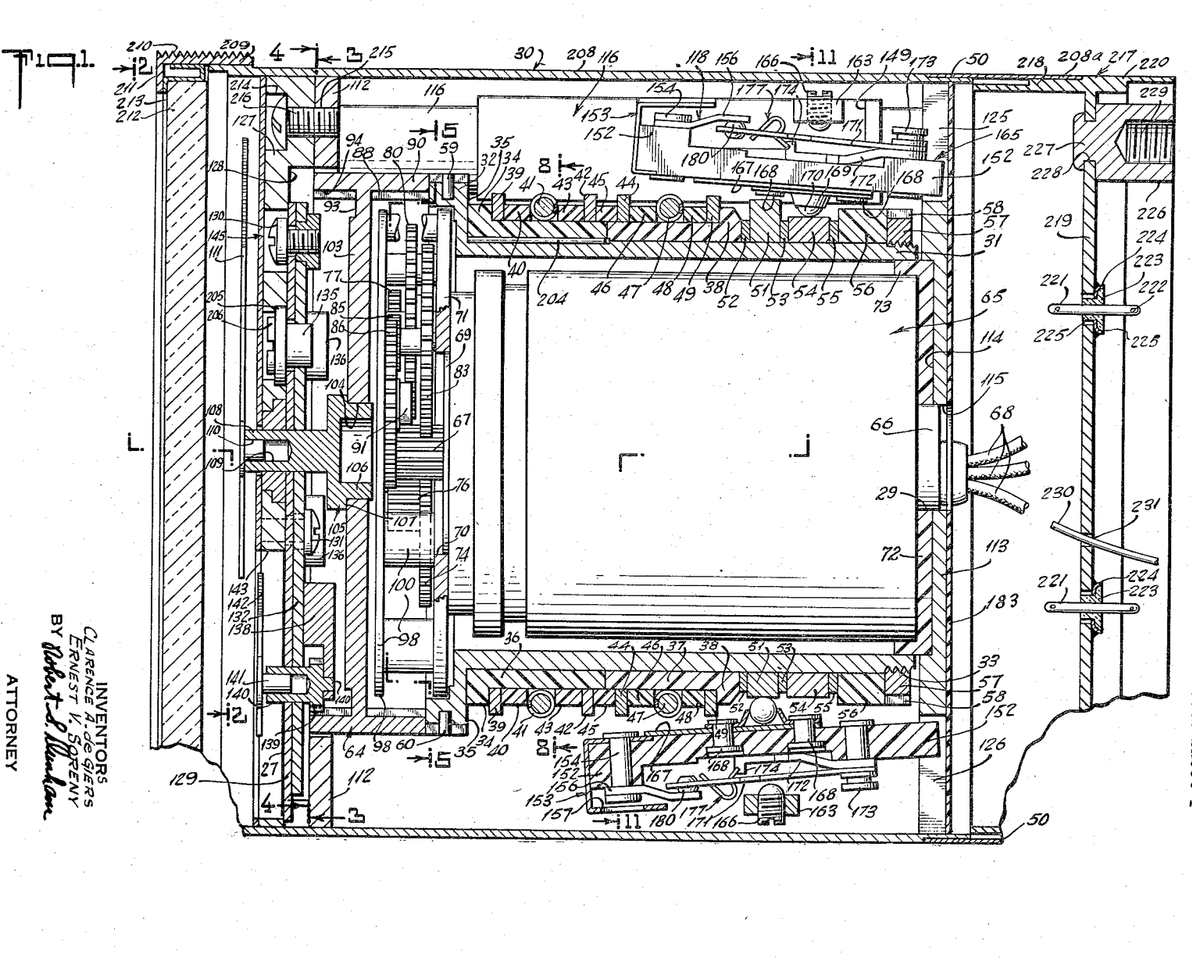
Figure 1 is an enlarged cross-sectional elevation taken substantially along the line 1—1 of Figure 2.

Referring first to Figure 1, our new and improved indicator telemetering device, generally designated by the numeral 30, comprises a tubular body 31, having a flange 32 on one end thereof, which flange will presently be described, and the other end carries threads 33. The flange 32 forms a shoulder 35 against which the shoulder 34 of a tubular insulating element 36 abuts. The shoulder 34 is preferably formed integral with the tubular part 36. Also mounted on the tubular body 31 is a second tubular insulating element 37 having a shoulder 38 formed integral therewith.

Carried on the element 36 and abutting the shoulder 34 thereof is a metallic ring 39 which might be termed a collector ring. Abutting the collector ring 39 is an insulating ring 40 and in contact with the latter is an electrical winding which in the present instance may be termed a potentiometer winding 41. Abutting the potentiometer winding 41 on the opposite side thereof is an insulating ring 43, which may be identical with the insulating ring 40 and which cooperates to hold the potentiometer winding 41 a predetermined distance from the shoulder 35.

Abutting the insulating ring 43 in a metallic ring 42 which might also be termed a collector ring, and contacting the metallic ring 42 is an insulating ring 45, which might also be identical with the rings 40 and 43. The function of the ring 45 will presently be described. The insulation member 36 with its shoulder 34 supports the collector ring 39, the insulating rings 40 and 43, the potentiometer winding 41, and the collector ring 42, and forms a unitary structure movable as a unit, since the potentiometer winding 41 and all of the rings are keyed together.

This unitary structure is positioned on the tubular body 31 with the shoulder 34 abutting the shoulder 35 of the body 31, and usually remains in one position thereon as a reference point for the whole set up, as will be explained hereinafter.

The insulation member 37 with its shoulder 38 supports a collector ring 49 which is contacted by an insulating ring 48. A potentiometer winding 47 abuts the ring 48 and is contacted on its other end by an insulating ring 46, followed in line by a collector ring 44. These elements are all keyed together to form a unitary structure, which is placed on the body 31 with the collector rings 42 and 44 adjacent to each other and commonly contacted or separated by the insulating ring 45 (referred to above).

Between the shoulder 38 on the element 37 and a cam 51 is a movement isolating ring or spacer 52, which abuts one face of the cam 51, and abutting the opposite face of this cam is another movement isolating ring 53. The ring 53 is, in turn, contacted by one face of a cam member 54, and a movement isolating ring 55 is positioned between the cam 54 and a spacer ring 56. In contact with the right face of the spacer 56, as seen in Figure 1, is a metallic ring member 57, which has internal threads that engage or mesh with the threads 33 on the tubular body 31. To facilitate tightening the array of elements 39 to 56 inclusive against relative movement or slippage, we provide notches such as the one shown at 58 in the clamping ring 57 so that a spanner wrench may be used for tightening the same.

The flange 32, Figure 1 and also Figure 5, has oppositely disposed radial pins 59 and 60 which are adapted to be engaged by slots 61 and 62 respectively, and these slots are formed in an annular portion 63 of a double internal ring gear 64 which will presently be described in connection with Figure 5.

Mounted within the interior of the tubular body 31 is an electric motor 65 which has a boss 66 on one end thereof, and which has a pinion 67 on the other end thereof, and connecting wires, generally designated by the numeral 68, extend from the boss end of the motor. The motor 65 has a locating boss 69 formed on the other end thereof concentric with the pinion 67, and this boss cooperates with and is located by a hole 70 formed in a plate member 71.

Returning to the first mentioned end of the motor 65, a cup-like member 72 formed of an anti-friction material as "Nylon" or the like, is mounted in a cylindrical recess 114 of a back plate 113 and has an annular flange portion 73, and it has a central hole 29 therein which is aligned with a central hole 115 formed in said back plate. Thus the boss 66 on the motor fits the aligned holes 29 and 115, and the outer diameter of that end of the motor fits into the flange portion 73. Screws (not shown) extend axially through the back plate 113 and into the frame of the motor, holding the motor in fixed relation to the back plate. The tubular body extends over the flange 73 of the member 72 and is journaled thereon.

Figures 5, 6, 7:
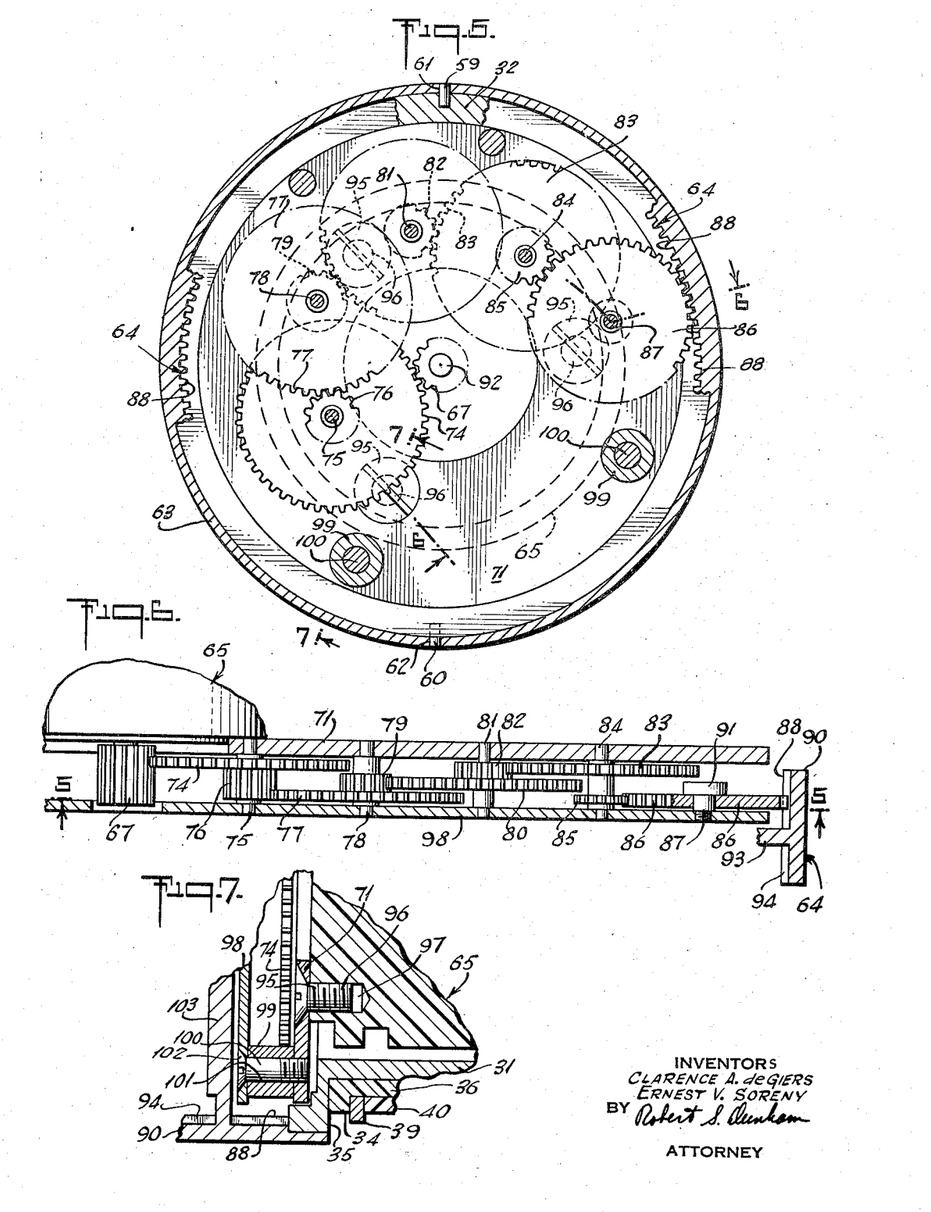
Figure 5 is a view taken along the line 5—5 of Figure 1, and showing the gear train.
Figure 6 is an elevational view of the gear train of Figure 5 as if it were seen along the line 6—6 of Fig. 5 developed into a straight line.
Figure 7 is a fragmentary view partly in section and taken along the line 7—7 of Figure 5.

Referring to Figures 5 and 6, the pinion 67 meshes with a gear 74 which is carried on a shaft 75. On the same shaft with the gear 74 and rigid therewith is a pinion 76 which meshes with a spur gear 77 carried on a shaft 78. The shaft 78 also carries a pinion 79 which is rigid with the spur gear 77 and which meshes with a gear 80 carried on a shaft 81. The shaft 81 also has fixed thereon and rigid with the gear 80 a pinion 82 which meshes with a gear 83. The gear 83 is carried on a shaft 84 and this shaft also carries a pinion 85 which is rigid with the gear 83 and which meshes with a gear 86 which is freely rotatable about a stationary pintle 87, and the gear 86, in turn, meshes with teeth 88 formed within the flange portion 90 of the double internal ring gear 64.

The gear 86, as will be noted in Figure 6, is mounted for free rotation on a pintle 87 constituting the shouldered portion of a shouldered screw 91. When the motor 65 is energized, its shaft 92, carrying the pinion 67 is rotated; and this pinion drives the train of gears described above; and since the motor is fixed to the back plate 113, its stator remains stationary. The gear 86 drives the double internal ring gear 64, and the tubular body 31 is rotated thereby.

On the opposite side of a central web 93 supporting the flange portion 90 of the double internal ring gear 64 is an internal ring gear portion 94 which is identical with and oppositely disposed with respect to the internal ring gear portion including teeth 88, and which drives a pinion that effects the rotation of a sub pointer, which will presently be described.

Referring now to Figure 7 a flat head screw 95 passes through the plate member 71 and its threaded body 96 engages a tapped hole 97 in the stationary part of the motor 65. Thus the plate element 71 is rigidly secured to the motor housing. The shafts 75, 78, 81 and 84, Figures 5, 6 and 7, are journaled in sets of aligned holes formed in the plate elements 71 and 98, and the plate element 98 is maintained a fixed distance away from the plate element 71 by means of spacer sleeves 99. The sleeves 99 are maintained in position by means of screws 100 passing through holes 101, in the sleeves and engaging threaded holes in the plate member 71, the screws 100 preferably having flat heads 102, which are seated in countersunk holes in the plate 98.

The web 93, Figures 1, 5 and 6, has a thickened portion 103. The portion 103 has a central hole 104 formed therein. Secured in this hole is a stepped bushing 105, a portion 106 thereof being frictionally secured in the hole 104 and a shoulder portion 107 thereof bearing against the surface of the portion 103. The bushing 105 has a shaft extension 108 with a tapered hole 109 formed therein to accommodate a tapered shaft 110 carried by an indicator pointer 111.

Figures 8, 9, 10, 11:
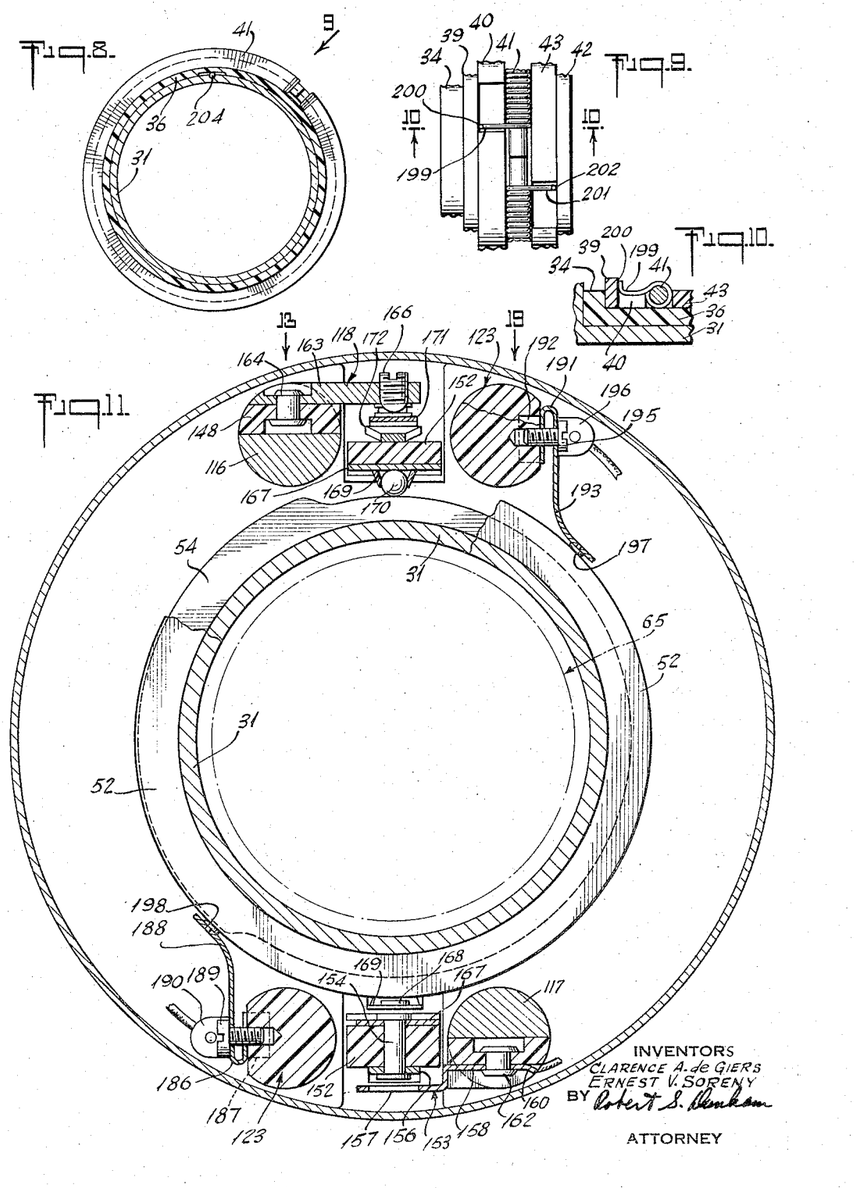
Figure 8 is an elevation, partly in section, taken along the line 8—8 of Figure 1 and showing a potentiometer and other features.
Figure 9 is a fragmentary view as viewed in the direction of the arrow 9 in Figure 8.
Figure 10 is a fragmentary sectional view taken along the line 10—10 of Figure 9.
Figure 11 is an enlarged cross-sectional view, taken substantially along the line 11—11 of Figure 1.

An annular ring 112 is mounted on posts 116 and 117, Figs. 1 and 11, which extend from one end of the device to the other end which serve to maintain the annular ring 112 and the back plate 113 a predetermined distance apart, the posts 116 and 117 being secured to both the ring 112 and the back plate 113 by screws 119. The back plate 113, Figures 1, 12 and 13, has a series of slots or notches 125 and 126 formed therein each in alignment with one of our new and improved switches. The cooperation of the switches with the slots 125 and 126 will be described in connection with the switches shown in Figures 12 through 22 inclusive. The switch posts 116 and 117, as stated above, are disposed between the back plate 113 and the annular ring 112, and one of these posts 116 is shown in elevation in Figure 13. It will be noted in this figure that the post 116 carries a switch generally designated by the numeral 118 and this will presently be described in connection with Figures 12 through 22. The device shown and described herein has a capacity for four or five switches and one potentiometer, or it may have two switches and two potentiometers as particularly shown and described herein. The post 117 may be identical with the post 116, see also Figure 4, and, in fact, other similar posts may be disposed about the circle as desired. The screw holes in the annular ring 112 and the back plate 113 may be countersunk to accommodate filister head screws such as those shown at 119, Fig. 13.

Figures 24, 25, 26:
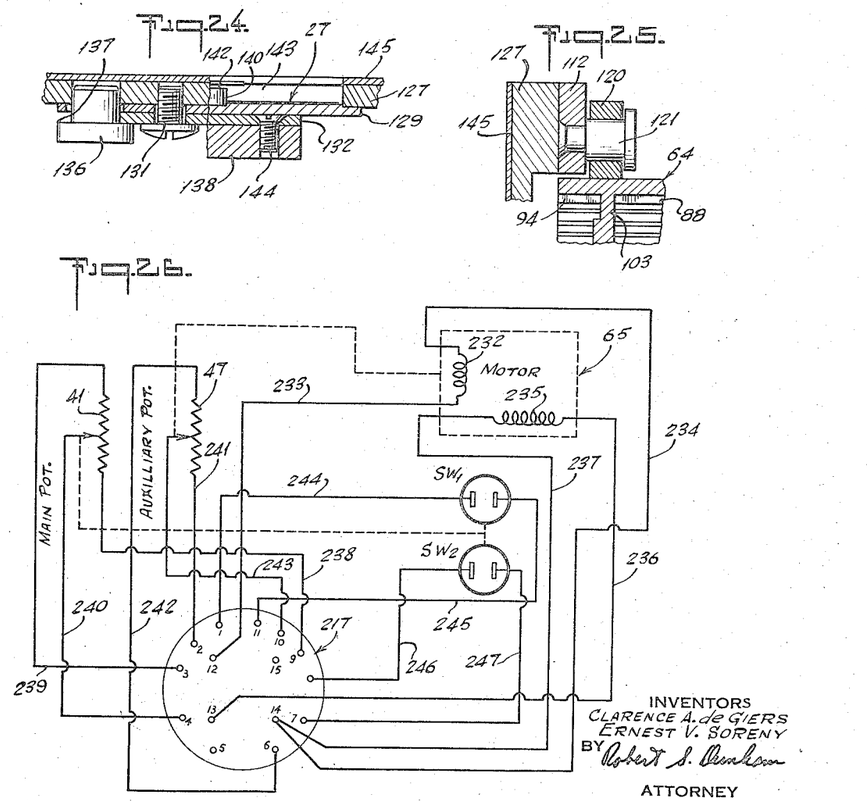
Figure 24 is a fragmentary view in section taken along the line 24—24 of Figure 3.
Figure 25 is a fragmentary sectional view taken along the line 25—25 of Figure 4.
Figure 26 is a circuit diagram showing connections to the device and to a power source and control means constituting an installation.

Returning now to Figures 1 and 4 and also considering Figure 25, we provide rollers 120 disposed 120° apart and carried on studs 121 which are fixed on the ring 112. These rollers are preferably provided with ball bearings (not shown) and they are in contact with the outer periphery of the double internal ring gear 64, and thus provide a bearing for the outer end of the rotor structure.

Figures 2, 3, 4:
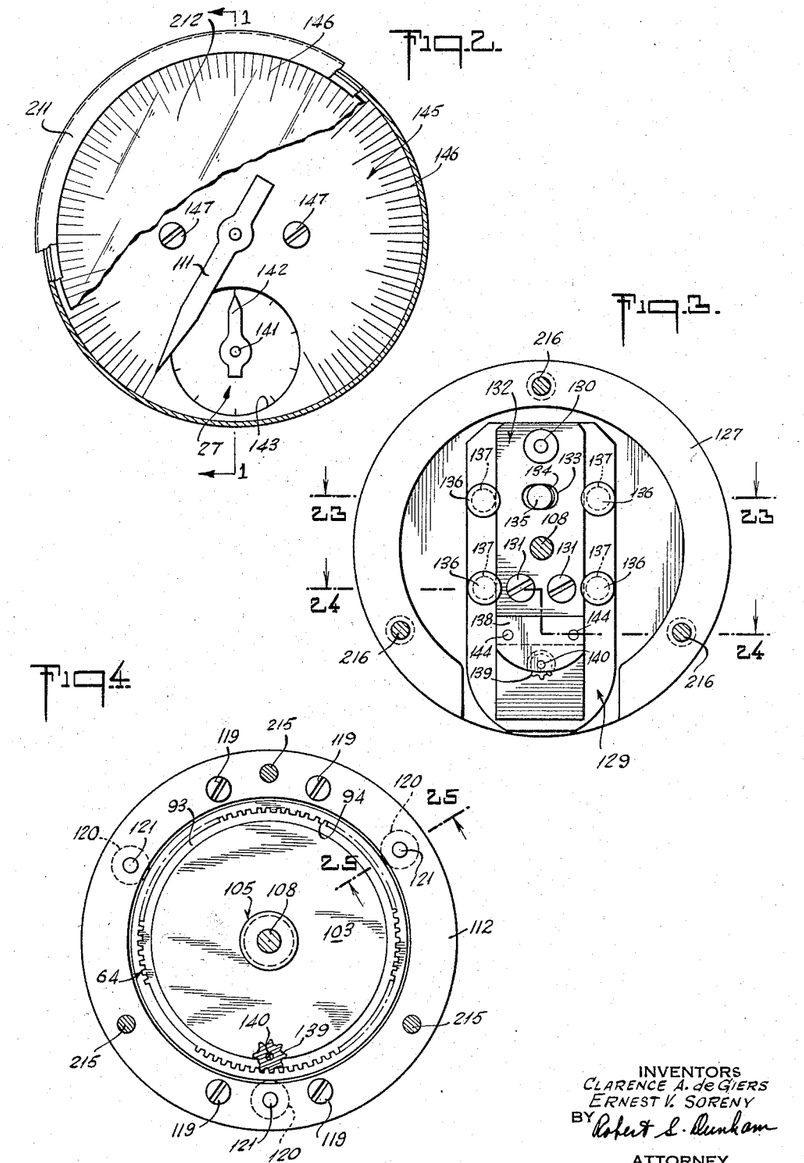
Figure 2 is an elevational view taken substantially along the line 2—2 of Figure 1.
Figure 3 is an elevational view taken on the line 3—3 of Figure 1.
Figure 4 is an elevational view taken along the line 4—4 of Figure 1.

Referring now to Figures 1 and 3, a disc like plate member 127 has a depression 128 formed in the rear face thereof. Mounted in this depression is a generally rectangular plate 129 which is secured in the depression 128 by means of two screws 131 which extend into the plate 127. A locking screw 130 extends through an enlarged hole in the plate 129, and engages a threaded and shouldered collet which is positioned in an enlarged hole in a plate 132 and is arranged upon loosening the screw 130 to release the plate 132 when an adjustment is to be made, and for locking the plate afterwards. The plate 132 has a central hole therein forming a clearance for the shaft 108 which carries the main pointer 111. The plate 132 also has a laterally elongated hole 133 formed therein, and mounted in the plate 127 and extending through the plate 129 and into the hole 133 in the plate 132 is a cam or eccentric 134 by means of which, after the screws 130 and 131 have been loosened, a shaft 135 which carries the eccentric 134, may be rotated to move the movable plate 132 up or down in a vertical direction as viewed in Figure 3.

For guiding the movable plate 132 on the plate 129, the latter carries two pairs of shouldered studs 136, each stud having a shoulder portion 137. The shoulders on the four studs are in intimate contact with the edges of the movable plate 132, without any lost motion so that the movable plate 132 cannot move laterally. It can only move on a vertical path as pointed out hereinabove.

Figure 23:
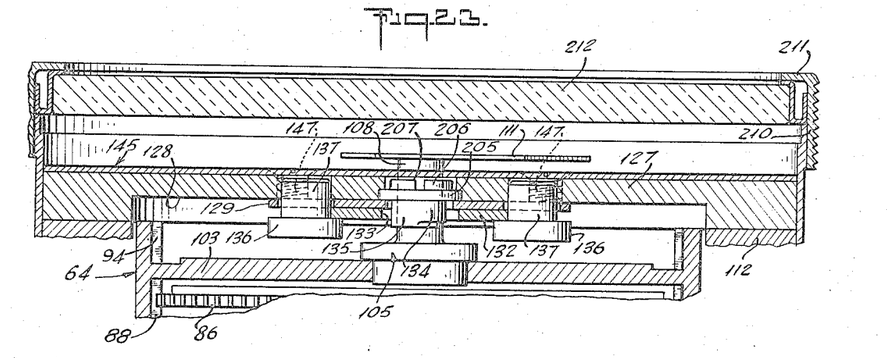
Figure 23 is a fragmentary sectional view taken along the line 23—23 of Figure 3.

Plate 132 carries a metallic block 138 which may be doweled or otherwise accurately secured thereon, as by screws 144, and this plate is notched out to accommodate and to provide clearance for a pinion 139 which carries a tubular shaft 140 into which the tapered shaft 141 of a sub-pointer 142 fits. The plate 127, Figures 1 and 2, has a circular depression 143 formed therein, and positioned in the depression is a dial plate 27 which is traversed by the sub-pointer 142. This may be clearly seen in Figure 2 as well as the pointer 142 and the shaft 141. As seen in Figures 1 and 23, the shaft 135 has a flange 205 formed thereon, and the outer extremity of the shaft 135 is in the form of a head 206, and it is provided with a screw driver slot 207. In Figure 24, one of the shouldered studs 136, 137 is shown in guiding relation with the plate 132. Also one of the screws 144 securing the metallic block 138 to the plate 132 is shown, as well as one of the screws 131 which clamps the two plates 129 and 132 to the plate member 127. The screws 131 normally positively clamp them to 127, and when the shaft 135 is rotated to make an adjustment, the cam or eccentric 134 may exert sufficient power against the inner surfaces of the elongated hole 133 in the plate 132 to move the plate without loosening the screws 131; and then the clamping effect of the screws 131 is sufficient to hold any adjustments.

When the device is assembled, the shaft 135 may be rotated in either direction, with a screw driver engaging the slot 207, so as to move the plate 132 vertically. With the pinion 139 meshed with the teeth in the outer portion 94 of the double internal ring gear 64, the shaft 135 may be rotated so as to move the plate 132 upwardly or downwardly on the vertical axis until a desired amount of back lash between the pinion and the ring gear is taken up.

A dial plate 145, having suitable graduations 146 thereon, has a pair of spaced apart holes extending therethrough, and in these holes are screws 147 which engage corresponding holes formed in the plate 127 and thereby the dial is maintained in fixed relation to both said plate and to the body to which it is secured. After the dial has been mounted as described, the main pointer 111 and the sub-pointer 142 are inserted in the tapered holes of the respective shafts 108 and 140 and the dials are calibrated so that the large dial reads, for example, in thousands of pounds, and the graduations of the small dial 27 within the depression 143 read in hundreds of pounds.

Figures 12, 13, 14, 15, 16, 17, 18, 19, 20, 21, 22:
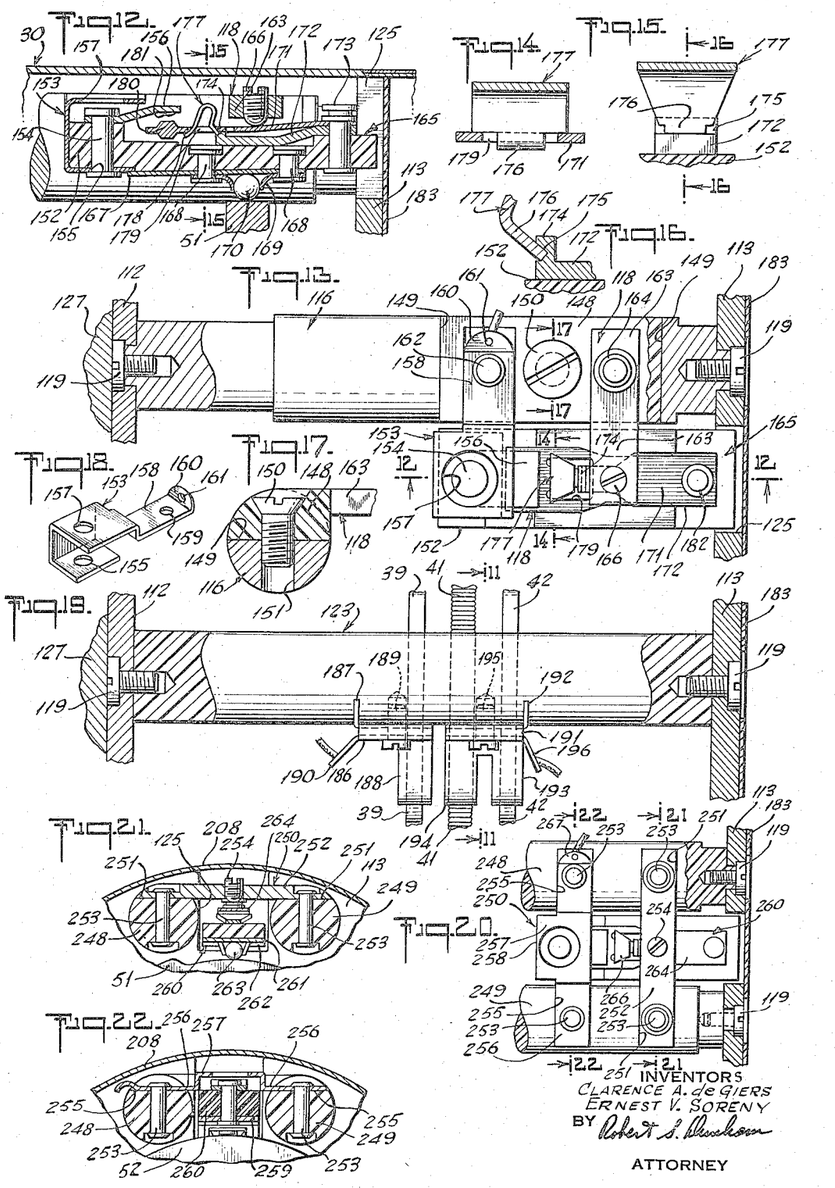
Figure 12 is a cross-sectional view of one of the came actuated switches in its open position, as seen along the line 12—12 of Figure 13.
Figure 13 is an elevational view of one of the switches and its supporting posts.
Figure 14 is a sectional view taken along the line 14—14 of Figure 13.
Figure 15 is a sectional view taken along the line 15—15 of Figure 12.
Figure 16 is a fragmentary view taken substantially along the line 16—16 of Figure 15.
Figure 17 is a view partly in section taken along the line 17—17 of Figure 13.
Figure 18 is a perspective view of the hinge spring of the switch.
Figure 19 is an elevation of an insulated post supporting brushes.
Figure 20 shows a modified arrangement in which the switch is conjointly supported by two spaced apart insulating posts.
Figure 21 is a sectional elevation taken along the line 21—21 of Figure 20.
Figure 22 is a sectional elevation taken along the line 22—22 of Figure 20.

Referring again to Figs. 11 and 13, and the switch posts 116, the switch 118 is comprised of a body 148 of insulating material which is set into a cutaway portion 149 of the post and is secured therein by means of a countersunk screw 150 threadedly engaging a hole 151 formed in the post 116 (see also Figure 17). A second insulating member 152, Figure 12, has a combined contactor and supporting element or hinge spring 153 connected to the insulating member 152 by means of a hollow rivet or eyelet 154 (see Figures 17 and 18 also). This eyelet extends upwardly through a hole 155 in the hinge spring 153, thence through a corresponding hole in the insulating member 152 and then through a lug 156. It is then clinched or riveted with a tool acting through a hole 157 formed in the upper portion of the hinge spring 153.

The hinge spring 153 has a rearwardly extending arm 158 with a hole 159 therethrough. The arm 158 has an angular portion 160 which has a hole 161 therein to which a conductor may be connected.

Referring again to Figure 13, the arm 158 above referred to is connected to the insulating body 148 by means of an eyelet 162. A bridge member 163 has a cross hole therein to accommodate an eyelet 164 for securing it onto the insulating member 148. This bridging member overhangs the movable switch body 165 and limits its movement in a direction away from an actuating cam such as, for example, the cam 51. This bridging member is provided with a round nosed screw 166 by means of which the outward movement of the insulation member 152 by the cam 51, for example, may be controlled. A metallic plate 167 is secured on the undersurface of insulating member 152 by means of eyelets 168 passing through holes in the plate 167 and through corresponding holes in a cupped member 169 and holes aligned therewith in the insulating member 152. The cupped member 169 has its apex removed to expose a portion of a ball 170 and this ball is positioned within the cupped member 169 before it is secured onto the plate 167 and the insulation 152. This leaves a surface of the ball 170 in cooperative relation with the cam 51.

A contact arm 171 is secured on the member 152 with a lug 172 beneath it by means of a hollow rivet 173 or in any other suitable manner. The lug 172, Figures 12 and 16, has an upturned extremity 174 with a lateral depression 175 in it to accommodate one extremity 176 of a toggle spring 177. The other end 178 of the toggle spring extends through a hole 179 formed in the arm 171. The arm 171 carries a contact point 180 which cooperates with a contact point 181 on the lug 156.

In cases where it is desired to have the switch double throw, a contact arm having a contact point to cooperate with the contact point 180 when it is in the position shown in Figure 12, may be employed. In the arrangement shown and described, where the switching is single pole single throw, one conductor may be connected to the portion 160 as shown in Figure 13; and the other to a connector stud 182 formed on the upper end of the hollow rivet 173 in the right hand end of the contact arm 171.

An insulating plate 183 is preferably of the same diameter as the back plate 113, and cutouts such as the cutouts 125 and 126 in the back plate receive and guide the free ends of the insulating member 152. This steadies the switch and smooths the action thereof under the urge of the cam which actuates the switch. From Figure 1, it will be noted that the cam 51 actuates one switch, and the cam 54 actuates the other.

The brush posts, one of which is shown in Figure 19 and designated by the numeral 123, is mounted on the structure by means of a screw 119 which has its head set into a countersink formed in the end ring 112 and engaging a threaded hole extending axially into one end of the post 123, and by means of a second screw 119 having its head set into a countersink in the back plate 113, and engaging a second threaded hole in the other end of the post 123.

The post 123 has a head portion 186, Figs. 11 and 19, which is secured thereto by a screw 189 engaging a laterally extending threaded hole in said post. The head portion 186 has a tab 187 which extends into a lateral slot formed in the post and prevents the head 186, and consequently a brush portion 188 formed integral therewith, from movement about the screw 189 as an axis. A connector lug 190 is preferably formed integral with the head portion so that a connection to the lug 190 is a positive connection to the brush 188.

A second head portion 191 is secured to the post 123 by means of a screw 195 engaging a threaded hole extending laterally into said post. The head 191 has a tab 192 which engages a lateral slot in the post 123 and prevents rotation of said head about the screw 195. The head portion has extending therefrom brushes 193 and 194.

The brushes 193 and 188, referred to above, have a contact surface 197 and 198 respectively (Figure 11) which preferably may be formed of gold or other precious metal to insure excellent electrical contact with the collector ring with which it cooperates. For example, in Figure 19, the collector ring 39 is contacted by the brush 188, and the brush 194 may cooperate with the potentiometer 41, and the brush 193 may cooperate with the collector ring 42. A lug 196 is preferably made integral with the head 191 and the brushes 193 and 194 to insure excellent contact in any connections made thereto.

In Figure 11, the lower switch which is identical to the upper one is shown in cross-section instead of in elevation, and the section line falls on the hollow rivet 154 of Figure 12 on a plane at right angles to the plane of Figure 12 and since the switch of Figure 12 has already been described in detail, this description need not be repeated; so, in Figure 11, the corresponding parts of the lower switch are given the same numerals as those in Figure 12.

The single brush 188 shown in Figure 19 is identical with the one shown in Figure 11, therefore the same numerals are given to corresponding parts in Figure 11. However in Figure 11, the brush 188 is provided with a gold tip contact point 198 which may be identical with the contact point 197.

Referring now to Figs. 9 and 10, the potentiometer 41 has one end 199 of its winding brought through an axial hole or slot in the insulating ring 40 and soldered, as at 200, to the collector ring 39. The other end 201 of the potentiometer winding is brought through an axial hole or slot in the insulating ring 43 and is soldered to the collector ring 42 as at 202.

Suitable spline means (not shown) may be provided for preventing relative rotation between the collector rings 39 and 42, the insulating rings 40 and 43 and the potentiometer winding 40 on the one hand and the tubular insulating body 36 on the other. Such spline means must of course be of an insulating character, so as to prevent short circuiting the potentiometer winding. Similar means (not shown) may be provided with respect to the tubular insulating body 37 and its collector rings 44 and 49 and its potentiometer winding 47. The cams 51 and 54 may be similarly splined to the tubular body 31, for example, by a spline means such as is shown at 204 between the tubular body 31 and the tubular insulating body 36, Figs. 1 and 8. In the case of each of the cams 51 and 54, however, it may be desired that some relatively minor angular adjustment be provided for as to the setting of these cams. For this purpose the spline grooves in these cams may be angularly elongated, so that they may be positioned at different angular positions about the tubular member 31, the adjustment when made being secured in each instance by tightening the threaded ring 57 as shown in Fig. 1. If desired, suitable spaced holes (not shown) may be provided in either or both the cam rings 51 and 54 to enable them to be turned by an appropriate spanner wrench or the like, once the threaded ring 57 has been loosened to permit such adjustment.

The presence of the mechanical isolating rings 52, 53, and 55 between which the cams 51 and 54 are sandwiched have keyways (not shown) fitting the associated key, and as either of said cams are being angularly adjusted, it is mechanically isolated from its neighbor, making sure that the adjustive movement of either one does not affect the other, and that a similar adjustive movement of the insulating element 37, carrying its potentiometer winding 47 with its collector rings 44 and 49 will not affect any adjustive settings of said cams.

The device is positioned within a tubular casing 208, Figure 1. The casing 208 has a stepped portion 209 and an extension 210 secured thereto which carries serrations, and it has a flanged portion 211, Fig. 23, which extends over a glass window 212 and provides an hermetically sealed unit.

The window 212 comprises a transparency through which may be seen both the positions of the large and the small pointers 111 and 142 over the large dial 145 and over the small dial 27 respectively. Surrounding the glass window 212 is a suitable cushioning member or expansion ring 213. The plate member 127 has a countersunk hole 214 and the annular ring 112 has an aligned threaded hole 215 so that screws such as the one shown at 216 may be employed to secure the elements 112 and 127 together.

Secured to the tubular casing 208 on the other end thereof is a cap member or end plate 217, which has a portion 218 which is embraced together with a portion of the tubular casing 208 by a sealing band 50 following which the band is soldered to both, then the interior of the casing 208 may be gas filled if desired.

The cap member 217 has a closure web 219 which is preferably formed integral with a flange-like rim portion 220 thereof. Set and sealed into the disc-like closure are feed through insulated pins or terminals 221—222. Each such terminal is provided with a ceramic body 223 surrounding the stem thereof, said body being hermetically sealed into a metallic cup 224. A hole 225 in the disc-like closure 219 receives the cup 224 and has it soldered or otherwise hermetically sealed thereto.

The disc-like closure 219 may also carry a series of studs 226 which have shank portions 227 extending through holes 228 in the disc-like closure and swaged or riveted thereto as shown. Each stud 226 may have a threaded hole 229 formed therein. After the device has been assembled and has the cap member 217 suitably applied thereto in a manner to effect an hermatic seal of the inside of the device and a capillary tube 230 which has been set into a hole 231 formed in the disc-like closure 219 with a fluid tight connection (not shown), is provided for the purpose of exhausting the air from the interior of the assembly as a final step. This may be done by connecting the capillary tube to a vacuum pump or system much in the manner of exhausting a thermionic tube, following which the capillary tube may be sealed off in any suitable manner. In some instances, as aforesaid, it may be found desirable to replace the air within the structure with an inert gas.

It will be understood that although only two terminals 221 are shown, as many terminals may be employed as necessary to carry the circuits from the outside to the interior of the casing. For example, in Figure 26, the circle 217 represents the cap member and it will be noted that 15 such terminals are employed and these are numbered from 1 to 15.

Figure 26 is diagrammatic but it shows the internal components which are connected to the terminals on the cap represented at 217. The motor 65 has one fixed phase winding 232 connected by a wire 233 to the terminal #12 on the cap. On the other end of the winding 232 is connected a wire 234 to the terminal #14. A control phase winding 235 has one end connected via a wire 236 to terminal #13 on the cap and the other end of this winding is connected by a wire 237 to the terminal #14. Thus, in effect, the motor terminals are the terminals numbers 12, 13 and 14.

The main potentiometer 41 has one extremity of its winding connected via a wire 238 to terminal #9 on the cap and the other extremity of this winding is connected through a wire 239 to terminal #3 on the cap. The movable contact is connected by a wire 240 to the terminal #4 on the cap. In use these terminals 9, 3 and 4 may be connected to the outside power amplifier (not shown). The auxiliary potentiometer 47 has one end of its winding connected via a wire 241 to terminal #2 on the cap, and the other end of this winding is connected by a wire 242 to terminal #6 and the movable contact of this potentiometer is connected via a wire 243 to terminal #10. Two terminals numbers 6 and 10 may be connected according to the disposal of the user.

Switch $SW_1$, which may be of the type shown and described in connection with Figures 12 to 18 has one terminal connected via a wire 244 to terminal #1 on the cap and the other contact in this switch is connected via a wire 245 to terminal #11 on the cap. This switch may be connected to any desired apparatus to be controlled. For example, it may be connected to a relay and in turn to a booster pump. Switch $SW_2$ has one contact connected via a wire 246 to terminal #8 and the other contact via a wire 247 to terminal #7. This switch may be used for any desired purpose, for example, it might be used to control a second relay and in turn a booster pump.

Referring now to Figures 20, 21 and 22, we show a modification of the switches in which each switch 250 is supported by two posts instead of one. Connected between the back plate 113 and the annular ring 112 is a pair of spaced apart posts 248 and 249. Each post is secured to the back plate and the ring in the same manner as described in connection with Figure 13 (by means of screws 119). The posts 248, 249 have aligned slots 251 formed therein, and set into these slots is a bar 252 which is secured by a means of hollow rivets 253 adjacent to each end. The bar 252 has a threaded hole to accommodate a round pointed screw 254. Spaced apart from the aligned slots 251 in the posts 248 and 249 are other aligned slots 255, Figs. 20 and 22, and set into thees slots and bridging the gap between the posts is a metallic strip 256 which has a shallow U-shaped depression 257 formed therein. Also formed integral with the strip 256 is a depending strip portion 258 which extends downwardly and is turned inwardly and has a portion 259 underlying and secured to a lever 260 which carries on its lower surface a metallic plate 261. Lying under the plate 261 is a second plate 262 which is struck out to carry a ball 263 in cooperation with a cam such as the cam 51. The lever 260 also carries a metallic strip 264 on the upper surface thereof which carries a contact (not shown) which cooperates with a corresponding contact carried on a contact arm in a manner similar to that shown in Figs. 12–18 and described above. A toggle spring 266, similar to the toggle spring 177 of Figure 12 is carried by the switch 250 in the same manner as that shown in detail in Figure 12. One terminal of the switch may be constituted by a lug 267 formed on the strip 256 and the other terminal may be the bar 252.

Both the switches of the forms shown are particularly adapted for mounting in confined spaces since the main elements of the switches within the circle of the confining case extend axially thereof where there is usually more room.

Figure 27:
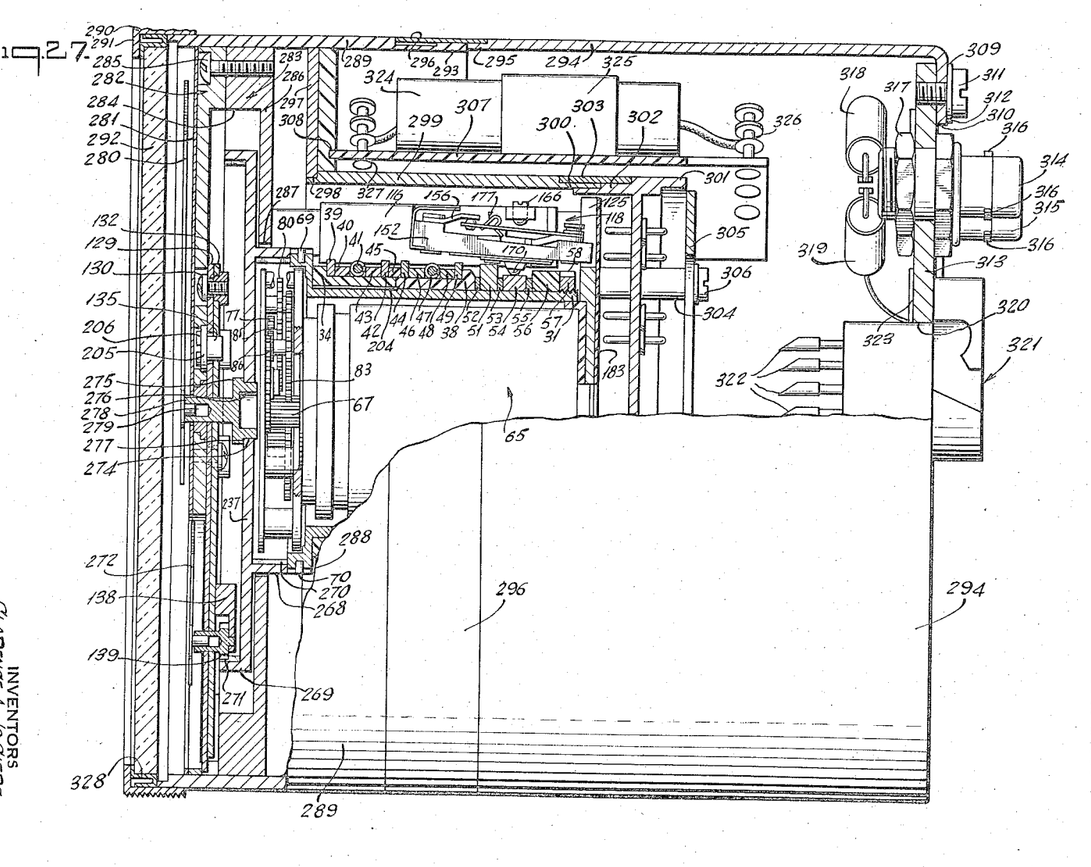
Figure 27 is a view partly in section showing the principal elements of the device of Figure 1 mounted in a larger casing which also includes some of the electronic power amplifier elements disposed about the device within the larger casing.

Referring now to Figure 27, we show a modification of the invention wherein an indicator of small diameter previously shown and described herein is placed in a larger casing, provided with a larger dial and some of the usual external components are positioned within said enlarged casing. In Figure 27, parts identical with those described hereinabove are given the same numerals and new elements are given new numerals. The tubular body 31 together with the cams, potentiometers and collector rings is provided with a motor 65, a train of gears comprising the pinion 67 on the motor and the gears and pinions 74, 76, 77, 79, 80, 82, 83, 85 and 86 as in Figs. 5 and 6 mesh with an internal gear formed within a cylindrical flange 268, which is of the same diameter as that of the flange portion 90. Formed integral with the flange 268 is a flange 269 of larger diameter. The flange 268 has internal teeth 270 with which the gear 86 is meshed, and the flange 269 has internal teeth 271 with which a pinion 139 that drives a pointer 272 is meshed. Joining the flanges 268 and 269 is a web 273 which has a central hole 274 therein, and a stepped bushing 275 has a portion 276 which is mounted and frictionally secured in the central hole 274 with a shouldered portion 277 thereof in contact with the face of the web. The bushing has a shaft extension 278 with a tapered hole 279 therein to accommodate a tapered shaft on the main pointer 280. The pointer 280 traverses a calibrated dial carried on a plate 281, and this plate is mounted on a disc-like member 282 corresponding generally to the member 127 previously described. Supporting the disc-like member 282 is an annular housing 283 for the gear 269. This housing has a hollowed-out portion 284 which is substantially larger than the diameter of the gear flange 269 and the disc-like member 282 is secured to the annular housing 283 by means of a series of screws one of which is shown at 285. The hollowed-out portion is not as deep as the housing 283, therefore a web 286 is provided which is annular in form and which has a central hole 287 therein that clears the gear flange 268. The gear flange 268 has a comparatively thin annular extension 288 and slots formed in this annular extension ride over and are engaged by the radial pins 69 and 70 and thus the large double gear is accurately located on the structure in proper relationship with the gear 86 with which it cooperates. Surrounding the disc-like member 282 and annular housing 283 is a tubular casing 289 and this casing carries a serrated extension 290 similar to the extension 210 except larger in diameter. A flanged portion 291 extends over a glass window 292 which is similar to the window 212 except that it is larger in diameter, and a cushioning or expansion member 328 contacts the glass window 292.

The tubular casing 289 has a portion 293 of reduced diameter, while a mating tubular casing 294 has a portion 295 of reduced diameter and these portions are devised to abut one another when the tubular casing portions 289 and 294 are assembled into a sealing band 296. The portions 293 and 295 may be sweated or otherwise secured to the sealing band 296 after all of the internal connections and elements have been connected or otherwise permanently fixed. Within the tubular member 289 and secured thereto is an annular ring-like member 297 which has an internal hole 298. A tubular casing 299 has one end stepped and fitting into the hole 298 with a shoulder abutting the wall of the annulus 297. This tubular casing has a portion 300 of reduced diameter and a cap member 301 has a stepped flange portion 302 which engages the portion 300. A sealing band 303 spans both portions 300 and 302 and is adapted to be sweated or otherwise connected thereto in fluid tight relation. The cap member 301 carries a series of posts 304 by means of which an insulating ring 305 may be mounted by means of screws 306. Surrounding the tubular casing 299 and the cap 301 is a cylinder 307. The end of the cylinder is set into an annular groove 308 in an annular disc of insulating material suitably secured against the annulus 297, which centralizes it.

The tubular casing 294 has a portion 309 flanged inwardly leaving a hole 310. Covering the hole 310 and secured to the flange 309 by means of screws 311 and washers 312 is a closure plate 313. Mounted in the closure plate are male coaxial fittings, two of which is shown at 314 and 315 to accommodate fittings on coaxial cables, protrusions 316 thereon serving to bayonet-lock a female fitting on the cable thereto. The fittings 314 and 315 pass through holes in the closure plate 313 and are secured therein in fluid tight relation by means of nuts one of which is shown at 317. Connected to suitable terminals on the closure plate 313 are capacitors 318 and 319. Also mounted in the closure plate 313 and extending through a hole 320 therein is a multi-pin socket 321 which may have as many prongs 322 thereon as there are connections to bring out. This fitting is secured by a securing element 323 preferably in fluid tight relation to the opening 320 and in use a mating male fitting would be plugged into the multi-pin socket 321. Also within the casing 294 is a cylindrical condenser 324 which is secured on the insulating sleeve 307 by means of a strap or band 325. Within the insulating cylinder 307 at each end are terminals 326 and 327 to which terminals the condenser terminals may be connected; or any other instrumentalities may be connected to these terminals in accordance with the requirements of the user.

Although we have herein shown and described by way of example, a new and improved indicator, and a modification thereof, it will be understood that both of these are illustrative of how to practice the invention instead of being limitative as many changes may be made in the arrangements shown and described within the scope of the following claims.

We claim:

1. In an indicator device, a frame, a motor, a tubular member supported for rotation and coaxial with said motor, a plurality of control elements on said tubular member movable therewith and cooperating with stationary elements thereabout to effect certain controls, a pinion on said motor, a ring gear fixed to said tubular member and carrying a main pointer, said ring gear having internal teeth, gear reduction means between said pinion and said internal ring gear for rotating said tubular member, a second set of teeth on said ring gear isolated from said first teeth, a pinion meshing with the teeth of said second set and carrying an auxiliary pointer, a main dial on said frame traversed by said main pointer, and a secondary dial impressed into said first dial and traversed by said auxiliary pointer.

2. An indicator device according to claim 1, in which the respective sets of teeth on said internal ring gear are different in number.

3. In an indicator device, a motor having a shaft, a pinion on said shaft, a tubular member surrounding said motor and carrying control elements, a gear train operatively connected to said pinion, an internal ring gear having teeth to one side of a supporting web meshing with and driven by one of the gears in said train, other internal gear teeth to the other side of said web, a pinion supported for rotation in said device, main dial plate on said device, a main pointer carried in centralized relation to and adapted to traverse said dial plate, a secondary dial on said main dial plate, a secondary pointer cooperating with said secondary dial and driven by said last mentioned pinion in a definite ratio with said main pointer, and circuit means between said control elements and components to be controlled thereby.

4. In an indicator device, a motor having a rotatable shaft, a pinion on said shaft, a tubular member surrounding said motor and carrying control elements movable therewith and cooperating with stationary elements thereabout to effect certain controls, a gear train operatively connected to said pinion and comprising a speed reducer, an internal ring gear keyed to said tubular member and supported for rotation, said ring gear having teeth on one side of a supporting web driven by said train, other internal gear teeth on the other side of said web, a pinion supported for rotation in said device and carrying a secondary pointer, a main dial plate on said device, a main pointer connected to said tubular member and adapted to traverse said dial plate, a secondary dial carried by said first dial plate, said secondary pointer cooperating with said secondary dial and driven by said last mentioned pinion in a definite ratio with said main pointer, and circuit means between said control elements and components to be controlled thereby.

5. In an indicator device, a motor, a tubular member embracing said motor and having a flange at one end forming a shoulder, a non-conductive flanged bushing keyed on said member with its flange in contact with said first flange and carrying a set comprising potentiometer resistance means and collector rings connected thereto, a second non-conductive flanged bushing settably carried on said tubular member and carrying a second set comprising potentiometer resistance means and collector rings like said first set, insulated supports in said device, a set of individual brushes for said collector rings and said resistance means of said second set, means connecting a collector ring brush in each set with a brush of the same set contacting the resistor means thereof, switching means actuated by said member in definite time relation to the potentiometer action of said sets, and visual indicator means moved by said tubular member.

6. In an indicator device, a motor, a tubular member embracing said motor and having a flange at one end thereof forming a shoulder, a non-conductive flanged bushing keyed on said member with its flange in contact with said first flange and carrying a potentiometer set comprising a resistance winding and collector rings connected to the extremities of said winding, a second non-conductive flanged bushing settably carried on said tubular member and carrying a second similar potentiometer set, insulated supports on said device carrying sets of individual brushes contacting the respective collector rings and resistance windings, cam means adjustably carried on said tubular member and including lockable means for retaining the latter in an adjusted position, and switching means insulatedly supported on said device in cooperative relation with said cam means.

7. In an indicator device, a frame, a motor, a tubular member supported for rotation and coaxial with said motor, a plurality of control elements on said tubular member movable therewith and cooperating stationary elements thereabout to effect certain controls, a pinion on said motor, a ring gear fixed to said tubular member and carrying a main pointer, said ring gear having internal teeth, gear means interconnecting said pinion and said internal ring gear for rotating said tubular member, a second set of teeth on said ring gear isolated from said first teeth, a pinion meshing with the teeth of said second set and carrying an auxiliary pointer, means to adjust said pinion relative to said last teeth to minimize backlash, a main dial on said frame traversed by said main pointer, and a secondary dial impressed into said first dial and traversed by said auxiliary pointer.

8. In an indicator device, a frame, a motor, a tubular member supported for rotation and coaxial with said motor, a plurality of control elements on said tubular member movable therewith; said elements being settable and lockable relative to one another and comprising both electrical instrumentalities and cam means on said tubular member cooperating with switching means thereabout to effect certain controls, a pinion on said motor, a ring gear fixed to said tubular member and carrying a main pointer, said ring gear having internal teeth, gear reduction means between said pinion and said internal ring gear for rotating said tubular member, a second set of teeth on said ring gear isolated from said first teeth, a pinion meshing with the teeth of said second set and carrying an auxiliary pointer, a main dial on said frame traversed by said main pointer, and a secondary dial impressed into said first dial and traversed by said auxiliary pointer.

9. In an indicator device, a motor having a shaft, a pinion on said shaft, a tubular member surrounding said motor and carrying electrical control elements and cams in definite angular relation with one another, connections to said elements, cam actuated switches in cooperative relation with said cams, a gear train operatively connected to said pinion, a double internal ring gear operatively connected to said tubular member and having a rim comprising a first set and a second set of gear teeth, said first set of gear teeth meshing with and driven by one of the gears in said train, a second pinion supported for rotation in said device and meshing with said second set of gear teeth, a main dial plate on said device, a main pointer carried in centralized relation to and adapted to traverse said main dial plate, a secondary dial on said main dial plate, a secondary pointer cooperating with said secondary dial and driven by said second pinion in a definite ratio with said main pointer, and circuit means between said control elements and components to be controlled thereby.

10. In an indicator, a frame, a tubular member having a flange on one end thereof, internal ring gear means keyed to said flange and having a hub, spaced apart roller bearing means rotatably supporting said ring gear and one end of said tubular member, other bearing means in said frame spaced apart from said roller bearing means and rotatably supporting the other end of said tubular member, an electric motor within said tubular member having a boss on one end thereof journaled in a central hole in said other bearing means, a locating boss on the other end of said motor, a rotor shaft in said motor and projecting from said other end thereof, a pinion on said shaft, a gear reduction member unit located on said motor by said boss and having a gear train therein meshing with said pinion and with said internal ring gear, a visual indicator driven by the hub of said ring gear, and a second visual indicator driven by teeth on said internal ring gear.

11. In an indicator, a hollow cylindrical casing, a frame comprising spaced apart heads with axial spacer posts therebetween; each of said heads being formed of an annulus, one having a larger interior bore than the other; a tubular member having a flange on one end thereof, a double internal ring gear keyed to said flange; said gear having a hub, a rim, a web therebetween, and internal teeth formed in said rim on each side of said web; said tubular member being positioned within said frame and the flange supported ring gear being carried on peripherally spaced roller bearing means about said larger interior bore, threads formed on the other end of said tubular member, a threaded locking ring engaging said threads, control elements carried on said tubular member between said locking ring and said flange adapted to be set relative to one another and locked in a set relation by said locking ring, and other non-rotatable elements within said casing cooperating with said control elements.

12. The invention according to claim 11, wherein some of said control elements are sets of electrical potentiometers, each set comprising a torroidally wound resistance having its extremities connected to individual slip rings, and others of said control elements are cams, and wherein the non-rotatable elements comprise sets of individual electrical brushes contacting the respective potentiometers and the corresponding slip rings, and wherein switching means are supported on said spacer posts in cooperative relation with said cams.

13. In an indicator device, an electric motor, a tubular rotor surrounding said motor and having a flange on one end thereof, a plurality of control elements on said rotor, movable therewith and cooperating with stationary elements thereabout to effect certain controls, a double internal ring gear keyed to said flange and having internal teeth disposed adjacent to said motor and having other internal teeth disposed opposite to said last teeth, a pinion on said motor, gear means between said pinion and said first internal teeth, a second pinion supported for rotation, meshing with said second internal teeth and carrying a secondary pointer, a shaft carried by said internal gear and in turn carrying a main indicator pointer, and dial means traversed by the respective pointers.

14. An indicator according to claim 11, in which a cylindrical outer housing embraces said cylindrical casing, in which said double internal ring gear has a rim of one diameter which cooperates with said peripherally spaced bearing means and another rim portion which is substantially larger in diameter than said first rim portion, both said rim portions carrying internal teeth and said last mentioned portion meshing with a pinion which is supported for rotation and carries a secondary pointer, and said hub carrying a main pointer; and in which resistances, capacitors and other cooperating elements are disposed about and adjacent to said hollow cylindrical casing.

References Cited in the file of this patent

UNITED STATES PATENTS

| | | |
|---|---|---|
| 1,960,020 | McGall | May 22, 1934 |
| 2,045,251 | Raber | Jan. 23, 1936 |
| 2,074,066 | Wheeler | Mar. 16, 1937 |
| 2,157,156 | Abendroth | May 9, 1939 |
| 2,699,542 | Harland | Jan. 11, 1955 |

UNITED STATES PATENT OFFICE

CERTIFICATE OF CORRECTION

Patent No. 2,875,431                                                           February 24, 1959

Clarence A. de Giers et al.

It is hereby certified that error appears in the printed specification of the above numbered patent requiring correction and that the said Letters Patent should read as corrected below.

Column 2, line 56, for "came" read -- cam --; column 3, line 44, for "in a" read -- is a --; column 10, line 27, for "thees" read -- these --; column 13, line 2, after "said" insert -- first set, other individual brushes for said collector rings and said resistance means of said --.

Signed and sealed this 2nd day of June 1959.

(SEAL)
Attest:

KARL H. AXLINE
Attesting Officer

ROBERT C. WATSON
Commissioner of Patents